United States Patent
Velthoven et al.

(10) Patent No.: US 8,254,717 B2
(45) Date of Patent: Aug. 28, 2012

(54) PICTURE ENHANCEMENT BY UTILIZING QUANTIZATION PRECISION OF REGIONS

(75) Inventors: Leo Jan Velthoven, Eindhoven (NL); Michiel Adriaanszoon Klompenhouwer, Eindhoven (NL); Remco Theodorus Johannes Muijs, Eindhoven (NL); Gerben Johan Hekstra, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 981 days.

(21) Appl. No.: 12/297,242

(22) PCT Filed: Apr. 17, 2007

(86) PCT No.: PCT/IB2007/051377
§ 371 (c)(1),
(2), (4) Date: Oct. 15, 2008

(87) PCT Pub. No.: WO2007/122554
PCT Pub. Date: Nov. 1, 2007

(65) Prior Publication Data
US 2009/0278953 A1   Nov. 12, 2009

(30) Foreign Application Priority Data
Apr. 21, 2006  (EP) .................................. 06112871

(51) Int. Cl.
*G06K 9/40*  (2006.01)
*H04N 5/14*  (2006.01)
*H04N 7/12*  (2006.01)

(52) U.S. Cl. ...................... 382/261; 348/27; 375/240.02

(58) Field of Classification Search ................... 382/261
See application file for complete search history.

(56) References Cited

U.S. PATENT DOCUMENTS

| 5,768,440 | A  | * | 6/1998  | Campanelli et al. | 382/261    |
|-----------|----|---|---------|-------------------|------------|
| 5,960,390 | A  | * | 9/1999  | Ueno et al.       | 704/200.1  |
| 6,144,700 | A  | * | 11/2000 | Kim               | 375/240.03 |
| 6,281,942 | B1 | * | 8/2001  | Wang              | 348/607    |
| 6,333,948 | B1 | * | 12/2001 | Kurobe et al.     | 375/240.13 |

(Continued)

FOREIGN PATENT DOCUMENTS

EP  1094420 A2  4/2001

(Continued)

OTHER PUBLICATIONS

Recardo L. De Queiroz: DCT Approximation for Low Bit Rate Coding Using a Conditional Transform, IEEE ICIP, vol. 2 of 3, IRN-ISBN 0-7803-7622-6, Sep. 22, 2002, pp. 237-240.

*Primary Examiner* — David Zarka
(74) *Attorney, Agent, or Firm* — Shimokaji & Assoc., PC (57) ABSTRACT

An apparatus for enhancing at least a region of an input picture having input pixel values enabling a reduction of quantization banding artifacts including an estimation unit arranged to estimate a quantization precision of at least the region of the input picture, a pattern analysis unit arranged to determine positions in the input picture of changes in input pixel value of less than or equal to the quantization precision, and to output analysis information representing the positions, and an adaptive filter, arranged to calculate an output picture corresponding to at least the region of the input picture, comprising output pixels being determined on the basis of adaptive combinations of input pixels, and arranged to determine the adaptive combinations in dependence on the analysis information.

17 Claims, 4 Drawing Sheets

U.S. PATENT DOCUMENTS

| | | | |
|---|---|---|---|
| 6,370,502 B1* | 4/2002 | Wu et al. | 704/230 |
| 6,445,464 B1* | 9/2002 | Kishimoto | 358/1.9 |
| 6,683,702 B1* | 1/2004 | Loce et al. | 358/3.09 |
| 6,741,965 B1* | 5/2004 | Shimoyoshi et al. | 704/500 |
| 2003/0035586 A1* | 2/2003 | Chou et al. | 382/233 |
| 2003/0112973 A1* | 6/2003 | Tsutsui et al. | 380/46 |
| 2005/0021815 A1* | 1/2005 | Haneda et al. | 709/231 |
| 2005/0196044 A1* | 9/2005 | Nagahashi et al. | 382/190 |
| 2005/0231615 A1* | 10/2005 | Kitani | 348/241 |
| 2006/0176199 A1* | 8/2006 | Nishide et al. | 341/143 |

FOREIGN PATENT DOCUMENTS

| | | |
|---|---|---|
| JP | 11224459 A | 8/1999 |

\* cited by examiner

PICTURE ENHANCEMENT BY UTILIZING QUANTIZATION PRECISION OF REGIONS

The invention relates to an apparatus, method, and software for enhancing the quality of a picture, in particular the numerical precision of its pixel values, and parameters usable for adaptively filtering pictures.

Picture means a single time instant representation of object shapes, but of course the invention also applies to collections of pictures, such as a movie.

In the present time there is a need for quality improvement of pictures and/or the display of them. Higher resolution, large size displays emerge, making more obvious to the customer the additional need for high quality color, which is for example critical with small gradient luminance or color transients.

One example of the problem occurs when a high dynamic range display is supplied with standard range (e.g. 3×8 bit) picture data. This picture data needs to be mapped to the larger range, i.e. intermediate values have to be calculated. Also, there is another trend to reduce the amount of data spent on encoding pictures, which may mean that the pixel values are represented with a low quantization precision.

In prior art the quality reduction has been mitigated with a number of masking techniques, for example dithering.

The problem with these techniques is that they provide no good quality solution. For example for the high dynamic range displays, the full scala of possible pixel values is not used. Also these masked images are not very suitable for further processing, in particular other enhancement techniques, since a dithering pattern may be amplified and become annoying.

An objective behind the realization of the below presented technical embodiments was the need for good quality image enhancement.

The objective is fulfilled the by apparatus (and corresponding method) for enhancing at least a region of an input picture (P_in) having input pixel values, comprising: an estimation unit (102) arranged to estimate a quantization precision (QP) of at least the region of the input picture;

a pattern analysis means (104), arranged to determine positions in the input picture of changes in input pixel value of less than or equal to the quantization precision (QP), and to output analysis information (INF_AN) representing the positions; and an adaptive filter (106), arranged to calculate an output picture (P_out) corresponding to at least the region of the input picture, comprising output pixels being determined on the basis of adaptive combinations of input pixels, and arranged to determine the adaptive combinations in dependence on the analysis information.

The inventors realized that the processing of the picture should be done in an intelligent way, or otherwise new artifacts may be introduced for each mitigation. In particular, one of the problems which the apparatus mitigates, is a very perceptible one when the quantization precision (also having other names such as e.g. bit depth) of the original input picture to be presented to the display is less than what the display can clearly display, and the viewer can see. This is particularly annoying in small, slowly changing gradients. E.g. the sky is known to have different colors of blue depending on the angle from the sun. In a low quantization precision representation this will show up as banding. These bands may be any distance apart, so they are relatively difficult to detect, and more so to remove. A desirable output sky rendering is a continuously varying gradient.

The inventors realized however that there is one predictable property of these badly quantized objects, namely their adjacent subparts along the gradient differ by exactly one quantization step. This can be detected by means of an adapted segmentation algorithm (e.g. region growing, with pixels having values equaling the present running value (or similar strategies for running averages) or differing by one quantization step only being allocated to the same segment, and pixels of larger difference belonging to a different segment). The same can be realized with an appropriately attuned edge detector, which makes a difference between edges with a pixel value change of one and larger change edges. If one applies pre-filtering, one can mathematically show that these single step changes will correspond to edge strengths of less than or equal to one quantization step, whereas larger edges (i.e. edges with a real new object rather than fake in-object quantization edges) will typically still show as edge strengths of larger than one quantization step.

Therefore the apparatus first determines the quantization precision.

This quantization precision may be determined for an entire picture. In this case a good method is to look at the histogram of the picture. If a global precision was used, the picture will show a histogram with spikes (e.g. only pixel values of 4, 8, 12, etc. are possible in the picture). The presence of the spikes and their inter-distance, which equals for this case the quantization precision, can be determined, e.g. by doing an auto-correlation. The position of the first peak yields then the quantization precision.

In other scenarios, other algorithms are used. E.g. there may be different quantization precisions in different regions of the picture, e.g. in sky versus foliage. In decompressed pictures (e.g. MPEG-2 or MPEG-4 standard) this may e.g. happen because different blocks got a different quantization scalar and/or matrix, depending on the particular bit allocation strategy, which typically takes into account such factors as pattern (or motion) complexity and visibility of errors to a viewer. A solution is to analyze the histogram of only a part of the picture to derive the quantization precision for that part, e.g. after a pre-segmentation. In case one e.g. only wants to improve the sky, one could use such properties in the pre-segmentation as the location of the sky and its bluish color.

Also, even if a lower part of the picture (e.g. containing grass or buildings) with highly precise pixel values is represented in the total histogram, the peaks corresponding to regions of lower precision may still be detected, e.g. when they occur in selective parts of the histogram (the green grass doesn't comprise any bluish colors, hence does not contribute to the histogram in the blue range), or when there are enough low precision pixels, in which the peaks may protrude above a baseline histogram level in that sub-range.

Subsequently, having the quantization precision available, the pattern analysis means (104) looks at where the single step changes are present, i.e. where at least sufficient filtering should occur. Typically one would like the larger edges unprocessed, as they will be real edges—at least they should not be due to bad quantization precision, and processing them will normally lead to a further deterioration.

In a simple embodiment it will just detect the presence of these single step edges, whereas more advanced embodiments may also look at patterns in the edges (e.g. one may not want to filter a specific single step zebra pattern within the buildings, as a washed out building may look worse; one can then look at e.g. density of edges or complexity of the pattern, e.g. a chessboard structure instead of simple banding; also for e.g. very low quantization precision in e.g. a foliage background one might consider to retain the original badly quantized remnant of the true underlying structure).

This analysis information (INF_AN) on where to enhance the picture, and preferably also how to enhance the picture (depending on the distance of the bands we should use a large enough smoothing filter) will be used by the adaptive filter (106), which will apply optimal or at least reasonable, sufficiently quality increasing filtering, thereby obtaining an effectively higher quantization, enhanced output picture of the original input picture or at least a part thereof. [Filter configuration unit 140 converts the analysis information into a filter setting, for example, a set of filter coefficients].

This analysis information converted to configuration parameters may be output separately, so that it can be applied e.g. for filtering the input image by a different device at a different location, and sold separately as a quality increase service. In this way it can be used to e.g. convert low quality previews (e.g. for portable displays) to higher quality purchasable content, typically in addition to supplying enhancement layer picture data.

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential.

Figure 1:
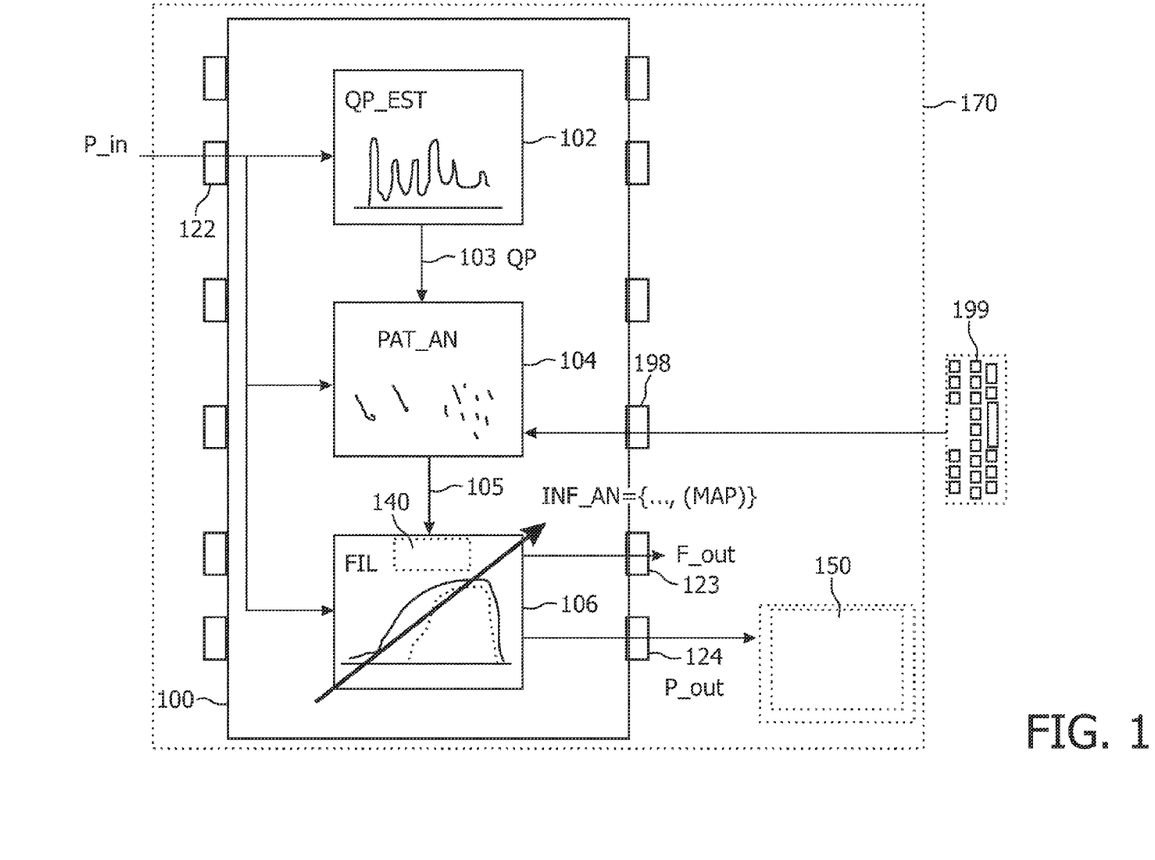
FIG. 1 schematically illustrates the apparatus, as incorporated in an exemplary picture display device.

The picture enhancement apparatus 100 in FIG. 1 receives an input picture P_in (for example a decompressed eight bits per pixel image) via input 122. An estimation unit 102 is arranged to determine by analyzing the input picture a quantization precision QP. This quantization precision may be for example for pixels differing in value with minimal steps of one, each pixel having e.g. gray values between 0 and 255, equal to one. The estimation unit obtains this value preferably by looking at a histogram of pixel values in at least the region of the image. In the exemplary case that QP=1 the histogram should have at least two adjacent bins containing pixel counts in a 256 bin representation. In another example a sky in an inserted picture behind a news-reader may be coarsely quantized because it originated from another source, and have only eight different luminance values (or similarly blue values) for the pixels. In that case the 256 bin histogram will have counts only in eight of its bins, each spaced 8 bins apart. This periodicity can be detected for example by autocorrelation analysis of the histogram.

The estimation unit 102 produces as an output the quantization precision QP as input for the next unit, a pattern analysis unit 104. The purpose of this unit is to detect whether there are, and where, fake edges due to the quantization precision. Advanced embodiments may be arranged to evaluate more in detail the actual distribution of such edges, so that for example particular spatial configurations of edges corresponding to a change of value for pixels on either side of one quantization precision can be detected, so that they can be filtered differently later on.

The pattern analysis unit may comprise for example a segmentation algorithm, which maps to a single segment a succession (preferably along a continuous path, for example determined on the basis of the direction orthogonal to the edges) of edges of one quantization precision difference/change. The pattern analysis unit may be further arranged to perform measurements on the edges for example their orientation, or the distance between adjacent edges, which may be used later on in the selection of an appropriate filter support size or shape.

Advantageous, simple embodiments of the pattern analysis unit 104 are arranged to work solely on the basis of edge detection, since it is the edges that need to be filtered. The adaptive filter 106, taking into account analysis information INF_AN output by the pattern analysis unit to determine for each region of the image an optimal filtering strategy (e.g. remove the fake edges, but protect other regions, e.g. by just copying the underlying data from the input picture, or applying a very weak filter) may be any filter that at least partly removes the fake edges, i.e. typically it will create reasonable (assuming that at least for visual quality reasons a simple actual luminance (and/or chrominance) profile underlies the ill-quantized one of the input picture) intermediate values, which on a high enough dynamic range monitor display in a more nicely looking image region than the banded one of the input picture. Thereto different filters known from prior art can be used, e.g. assuming some model profile, taking into account local statistics, etc. In the following simple analysis/filtering embodiments, linear filtering is used.

Some preferred, simple multi-scale adaptive enhancement strategies are described below, which not only have the advantage that they filter the fake edges and not real object edges, but also that they adapt (in a computational simple way by combining some intermediate pictures) the filtering optimally to the distance to an object with real edges, which avoids annoying halo due to the appearance of some object energy in the filtered region (e.g. sky) due to the linear pixel value combination.

Multiple Scale Filtering with Edge Analysis in Multiple Scales:

First a number of scaled pictures are generated (filtering units 201, 203, 205 in FIG. 2) by convoluting the input picture with smoothing filters of increasing size (generating pictures of the same number of pixels as the input picture, which is easy for later combination). Gaussian kernels may be advantageous, although other pixel value combination filters are possible.

Figure 2:
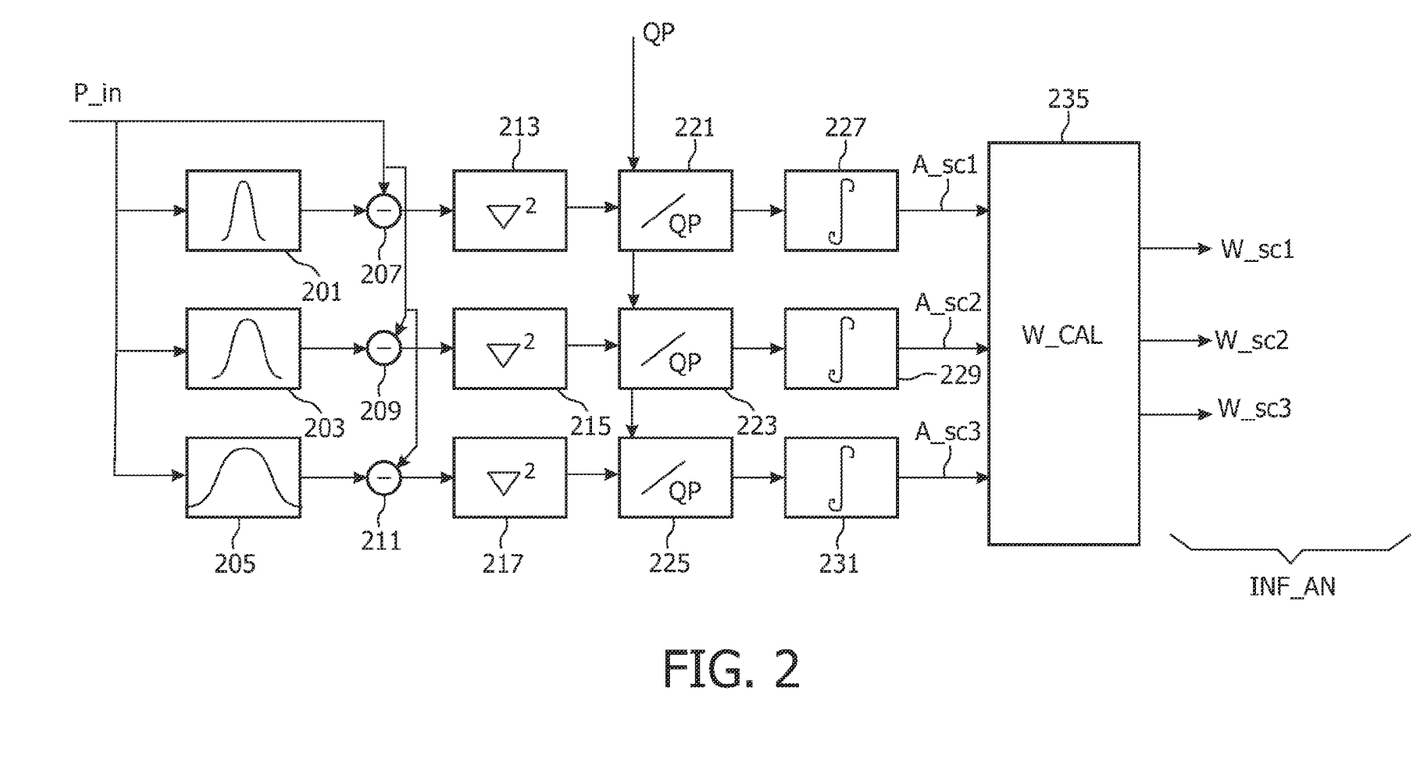
FIG. 2 schematically illustrates one possible embodiment of the pattern analysis unit 104.

Subsequently the input picture P_in and each of the smoothed pictures are subtracted (the original input picture and smoothed versions being input for subtracters 207, 209, 211; in the example 3 scales are used, however the skilled designer will use as many scales as may still be expected as relevant to typical banded pictures, or even more since the algorithm will automatically select the right contributions), yielding a number of difference images P_diff. These difference images comprise the input picture energy of the higher frequencies, up to some middle frequency dependent on the filter support size. Since a usual property of frequency dependent basis function decomposition is that the lower frequencies are allocated more energy, one can approximately say that such a difference image contains the input image structure at a particular middle frequency. The appearance of such a difference image is a collection of differential data around edges, i.e. a blurred edge representation (for example for a step edge the difference signal will show a downward pointing peak, followed by a steep rising edge, followed by an upwards pointing peak). Subsequently, an edge detection (preferably a second order edge detection, which detects the peaks) by edge detectors 213, 215 and 217 and a normalization (dividers 221, 223, 225) are performed (due to the linearity the order of these two operations is unimportant). The normalization consists of dividing for example the per pixel difference image values by the quantization precision QP.

This may be realized as an edge map (MAP), in which a value between zero and 1 indicates the presence of a fake edge, and zeroes indicate e.g. real edges (the map may also indicate edge activity).

Subsequently (preferably) an activity measure (A_sc1, . . . ) of the edges is calculated (activity determination units 227, 229, 231). Since a good scale to interpolate the fake edges is a scale which combines e.g. pixels of regions of three adjacent 1 quantization step change regions (in principle more scales could be used, or even a smaller filter support size as long as it sufficiently rounds the steps so that an oscillating profile occurs, which looks less banded), the particular activity detection unit (which is arranged in general how many edges there are in a region, how near to each other, and in advanced versions even whether they form particular desirable or undesirable spatial patterns for particular filtering) should find about three such edges falling in the support of the particular scale filter. This can be evaluated e.g. by having the activity determination unit integrate the edge energy over the particular support corresponding to that scale (e.g. of the filter kernel of the corresponding filtering unit 201, 203, 205), which can be realized by implementing the activity determination units comprising low pass filters. In such a way it is detected by merely looking at local pixel values of the low pass filtered output pictures of the activity determination units that at least one real object edge enters the filter support (or several edges which should not be blurred), which is to be avoided to avoid halo, i.e. only filters of lower size should contribute to the enhanced output picture P_out produced by the adaptive filter 106. A weight calculation unit 235 determines based on the analysis of the edge pattern structure of the input picture P_in the weights for contributions of filters of different scales. In this example, the adaptive filter combines the original input picture P_in with weighted combinations of the smoothed pictures:

$$P\_out = \frac{1}{N}\left(P\_in + \sum_s W\_sc_s G_s\right)$$ [Eq. 1]

(Gs is the local pixel value of a smoothed picture of scale s, W_scs is the normalized contribution required for the particular smoothed picture at the pixel location, and N a normalization factor, so that the filtered output picture has substantially similar energy as the input image).

In this way an optimal filter is simply realized by combining combination from appropriate scales (which corresponds to creating a particular filter shape from its scale decomposition). Of course this particular filter is just an example. One can also just filter for some pixel positions (instead of combining with the original picture structure), and the filter may have e.g. an object-adaptive support, e.g. determined dynamically by looking at pixel values in the input picture P_in, edge patterns, etc.).

Thereto the weight calculation unit 235 will typically be arranged to determine the first scale on which real edges are detected in the activity measure, and set the weights for this and coarser scales to zero. The weights for the finer scales are determined e.g. simply by mirroring around the one value of the activity (or any other edge derived value in a particular design), which is appropriately normalized between zero and 1 taking into account all scales:

$$W\_sci = 1 - A\_sci$$ [Eq. 2]

These weights are an example of possible analysis information INF_AN, however other structures are possible depending on how one wants to control the filter (e.g. an image with protection regions from which particular support shapes can be constructed for each pixel position to be filtered).

More advanced strategies for determining the weights may be employed, e.g. taking into account proprietary factors optimized according to taste over several typical input pictures.

Multiple Scale Filtering with Single Scale Edge Analysis:

Another simple embodiment of the pattern analysis unit 104 (still assuming e.g. a weighted multiscale filtering combined with the original picture) determines a typical characteristic scale. In this case a set of at least some of the coarsest smoothed pictures are created (e.g. by coarse filter 407 in FIG. 4), and difference pictures with the original (or a little smoothed version from filter 401) are created (to have a reference for the blurred energy of an undesired structure falling into the coarse filter support as detected at filter output position (x,y)), and they are again normalized with the quantization precision QP. This strategy exploits a particular geometrical property of smooth (fake, banded) gradients, namely when one applies successively larger filters to such an image pattern, successively more energy accumulates to any pixel position where the filtering is done. One can then create a graph as in FIG. 3, which determines how many of the scales contributed to the total result, an derive therefrom which scales should be used, which is done by scale evaluation unit 415, which is typically arranged to get as input the local pixel energy E (x,y) as estimated with the very coarse filter and evaluate the non-linear function of FIG. 3, outputting an optimal scale to filter (or a weighted combination of two adjacent filter scales).

Figure 3:
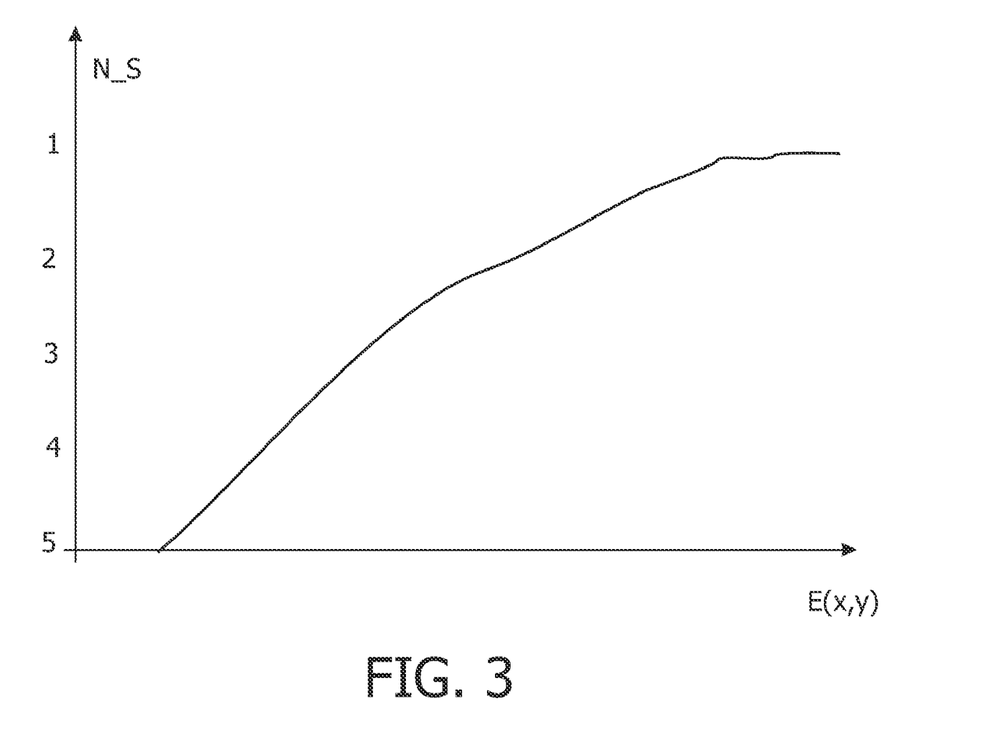
FIG. 3 schematically shows a graph which can be used to select automatically how many filter scales should contribute to the adaptive filtering.
Figure 4:
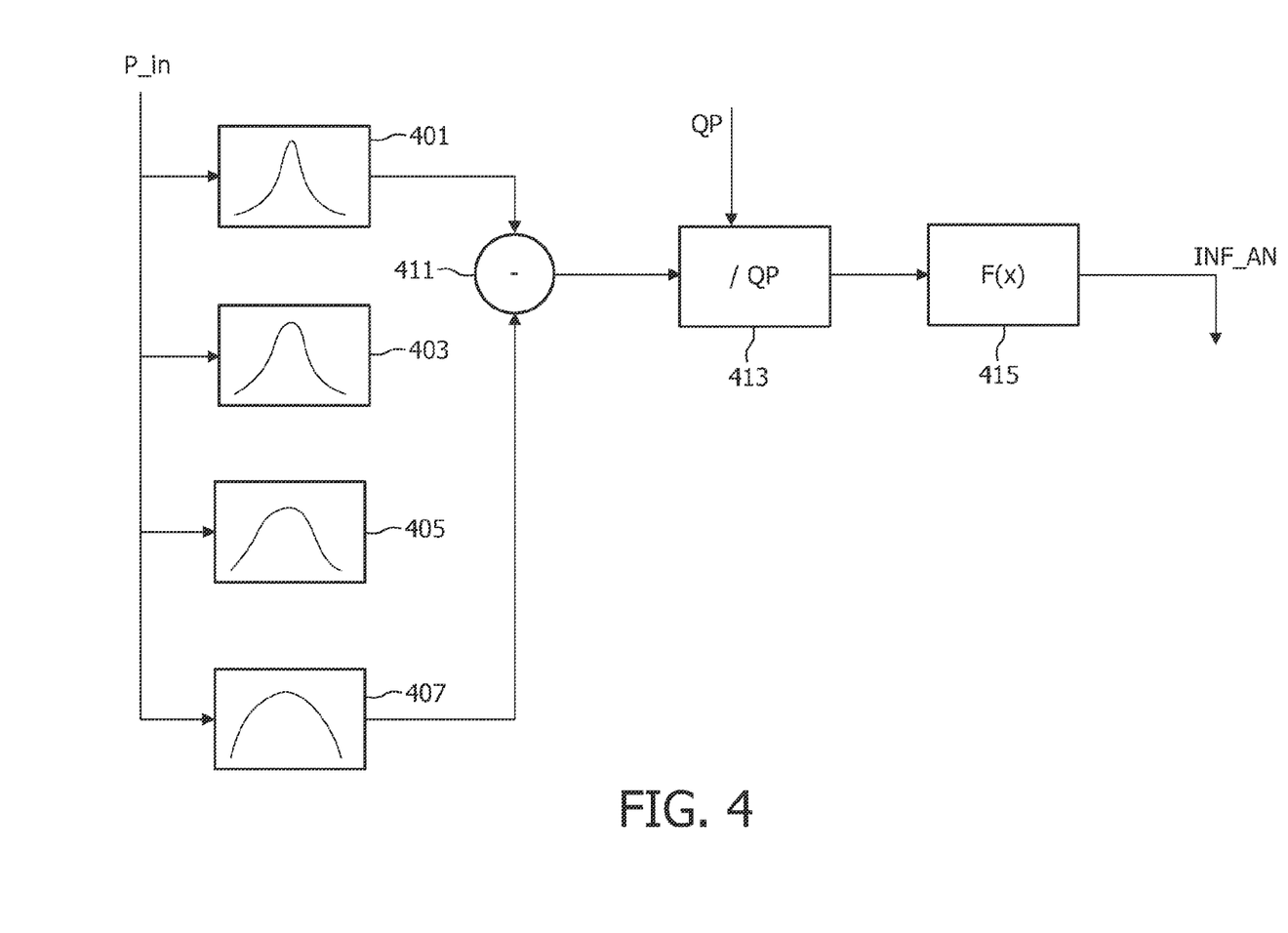
FIG. 4 schematically shows some relevant blocks of another embodiment of the pattern analysis unit 104.

This graph shows on the x-axis the local pixel energy E (x,y) for a particular input picture pixel to be filtered, derived by making a picture of the difference of a very heavily blurred version of the input picture and the input picture itself. If this energy is large, this means that in this coarse scale a real edge was detected, and it is not a good scale for contributing to the output picture, as it will introduce halo. For energies below half a quantization precision, the coarsest scale may be used by the filtering unit 106 for obtaining the output picture for that region. Hence the graph optimally determines (Y-axis) which of the smoothed images (N_S) will contribute to the weighted filtering. The higher the energy, the smaller the filter support (the finer the scale) that should be used by the filtering unit 106. In the example 5 scales are used, i.e. if the output number is 1, one only copies the original input picture pixel value to the output pixel. If the value is e.g. 3.5 one uses a combination of scales 3 and 4, and if the value is approximately 3, one uses only scale 3 in that region for filtering to obtain the final output image.

Filtering with Adaptive Support:

Another embodiment of the pattern analysis unit 104 determines positions to be included in the filter support of filtering unit 106. First a (typically heavily) smoothed image is generated, which forms a reference value for each pixel position, namely the local average. Then for each position, the input picture pixel value at said position is subtracted from the local average. The resulting difference image is normalized with the quantization precision QP.

Again, if the local pixel value is too different from the average, it should be excluded from the filtering, since it is probably a pixel within a different image object rather than a quantization artefact within the same image object, which would lead to halo. Hence the filter for optimally smoothing at position x with the coarse scale, will discard the contributions of those pixels, which automatically adapts the filter support shape to the underlying image/video objects. This avoids selecting perhaps a too narrow final filter (a strategy which can also be used: if a filter is too coarse, than a narrower optimal filter is selected for final filtering, but near objects this will typically result in using narrow filters, in which case the adaptive support filtering is better).

The filter support can be a binary one, including or excluding individual pixel positions in the filter operation for the generation of an output pixel, or alternatively the filter could use a more complex (proportional) strategy depending on the exact difference values. The advantage of an adaptive filter support is that for each pixel position an optimal sized and shaped support is calculated, resulting in an optimal reduction of the banding and fake edges, whilst preventing energy from real edges to be combined into the output pixel, and thus preventing the creation of halos.

It should be noted that changes of pixel value is generic for looking at whether in the surround only single quantization precision or larger changes are present, but this can be realized by different techniques such as classical spatial adjacent value comparison, such as edge detection, but also with methods which compare two or more values (images), one of which comprises a contribution of surrounding edges, such as a blurred version of the image.

Applications:

The mentioned apparatus is useful e.g. for portable display containing devices, which may receive bad input, but still get better and better displays. The algorithms may also be sold as software for image improvement either professional or consumer, and can be run at intermediate stations in a network. Another typical picture display device 170 is e.g. a high precision LCD t.v. (in which case the actual display unit 150 is an LCD panel). The analysis may be under the control of a human by means of user interface means 199, e.g. controlling the look on the t.v. (finetuning filter supports by deselecting certain contributions at certain filtering positions, etc.), especially in professional applications.

The analysis information or filter control parameters F_out may also be transmitted and sold separately.

The algorithmic components disclosed in this text may in practice be (entirely or in part) realized as hardware (e.g. parts of an application specific IC) or as software running on a special digital signal processor, or a generic processor, etc.

It should be understandable to the skilled person from our presentation which components can be optional improvements and be realized in combination with other components, and how (optional) steps of methods correspond to respective means of apparatuses, and vice versa. Apparatus in this application is used in the broadest sense presented in the dictionary, namely a group of means allowing the realization of a particular objective, and can hence e.g. be (a small part of) an IC, or a dedicated appliance, or part of a networked system, etc.

The computer program product denotation should be understood as encompassing any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not in-depth mentioned all these options. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An apparatus for enhancing at least a region of an input picture having input pixel values, comprising:
   an estimation unit arranged to identify the region of the input picture based on an estimate of a quantization precision;
   a pattern analysis unit, arranged to identify positions in the input picture of changes in input pixel value of less than or equal to the quantization precision, and to output analysis information representing the identified positions; and
   an adaptive filter, arranged to calculate an output picture corresponding to at least the region of the input picture, comprising output pixels being determined on the basis of adaptive combinations of input pixels, and arranged to determine the adaptive combinations in dependence on the analysis information, wherein the estimation unit is arranged to determine the quantization precision on the basis of a histogram of at least a second region of the input picture.

2. The apparatus as claimed in claim 1, wherein the pattern analysis unit is arranged to apply edge detection to the input picture, to produce an image of pixel values, denoting the presence of edges in a vicinity in the input picture of the pixels, and, the pixel values indicating the presence of edges corresponding to an input pixel value change of at least one of less than or equal to the quantization precision, and the pixel values indicating the presence of edges of an input pixel value change greater than to the quantization precision.

3. The apparatus as claimed in claim 1, wherein the pattern analysis unit is arranged to perform the determination of the positions in the input picture of changes in input pixel value of less than or equal to the quantization precision by means of a multi-scale analysis of the input picture.

4. The apparatus as claimed in claim 1, wherein the pattern analysis unit is arranged to perform a segmentation of the picture based on the positions in the input picture of changes in input pixel value of less than or equal to the quantization precision.

5. The apparatus as claimed in claim 1, wherein the pattern analysis unit is arranged to produce analysis information comprising at least one image of pixel values between a first and a second constant, for controlling a strength of the filtering at a particular pixel position performed by the adaptive filter.

6. The apparatus as claimed in claim 1, wherein the adaptive filter combines pixels of different scaled versions of the input picture.

7. The apparatus as claimed in claim 1, wherein the analysis information determines at least one of filter coefficient values, a filter support size, and a filter support shape.

8. The apparatus as claimed in claim 1, wherein the estimation unit is arranged to determine the quantization precision on the basis of an analysis of equally spaced peaks in at least a sub-range of the histogram.

9. The apparatus as claimed in claim 1, comprising a display for displaying the output picture.

10. The apparatus as claimed in claim 1, comprising an image sensor for capturing the input picture, and a unit for transmitting the output picture to one of a storage unit and a network.

11. The apparatus as claimed in claim 1, wherein the adaptive filter utilizes configuration parameters determined on the basis of the analysis information.

12. A method of enhancing at least a region of an input picture having input pixel values, the method performed by a processor, comprising acts of:
    estimating on the basis of a histogram of at least a second region of the input picture a quantization precision to identify the region of the input picture based on an estimate of a quantization precision;
    identifying positions in the input picture of changes in input pixel value of less than or equal to the quantization precision;
    generating analysis information representing the identified positions; and
    calculating an output picture corresponding to at least the region of the input picture, by determining output pixels on the basis of adaptive combinations of input pixels, the adaptive combinations depending on the analysis information.

13. The method as claimed in claim 12, comprising an act of determining configuration parameters on the basis of the analysis information to identify filter coefficients for adapting an adaptive filter.

14. A computer program product stored a computer readable non-transitory memory medium comprising code enabling a processor to execute a method, the method comprising acts of:
    estimating on the basis of a histogram of at least a second region of the input picture a quantization precision to identify the region of the input picture based on an estimate of a quantization precision;
    identifying positions in the input picture of changes in input pixel value of less than or equal to the quantization precision;
    generating analysis information representing the identified positions; and
    calculating an output picture corresponding to at least the region of the input picture by determining output pixels on the basis of adaptive combinations of input pixels, the adaptive combinations depending on the analysis information.

15. The computer program product as claimed in claim 14, comprising an act of determining configuration parameters for an adaptive filter on the basis of the analysis information.

16. An apparatus for enhancing at least a region of an input picture having input pixel values, comprising:
    an estimation unit arranged to estimate a quantization precision of at least the region of the input picture;
    a pattern analysis unit, arranged to determine positions in the input picture of changes in input pixel value of less than or equal to the quantization precision, and to output analysis information representing the positions; and
    an adaptive filter, arranged to calculate an output picture corresponding to at least the region of the input picture, comprising output pixels being determined on the basis of adaptive combinations of input pixels, and arranged to determine the adaptive combinations in dependence on the analysis information, wherein the estimation unit is arranged to determine the quantization precision on the basis of a histogram of at least a second region of the input picture.

17. The apparatus as claimed in claim 16, wherein the estimation unit is arranged to determine the quantization precision on the basis of an analysis of equally spaced peaks in at least a sub-range of the histogram.

* * * * *